United States Patent
Uebelhart

(10) Patent No.: US 7,267,035 B2
(45) Date of Patent: Sep. 11, 2007

(54) TOOL SUPPORT FOR LATHES

(75) Inventor: Baudoin Ernest Uebelhart, Oberdorf (CH)

(73) Assignee: Microswiss Technologie AG, Oensingen (CH)

( * ) Notice: Subject to any disclaimer, the term of this patent is extended or adjusted under 35 U.S.C. 154(b) by 0 days.

(21) Appl. No.: 10/566,259

(22) PCT Filed: Jul. 31, 2003

(86) PCT No.: PCT/CH03/00526

§ 371 (c)(1),
(2), (4) Date: Mar. 27, 2006

(87) PCT Pub. No.: WO2005/009674

PCT Pub. Date: Feb. 3, 2005

(65) Prior Publication Data

US 2006/0225544 A1 Oct. 12, 2006

(51) Int. Cl.
*B23B 3/00* (2006.01)
*B23C 1/00* (2006.01)
(52) U.S. Cl. .............. 82/121; 82/79; 82/107; 29/54
(58) Field of Classification Search .......... 82/121, 82/120, 138, 158, 159, 161, 79, 81, 93, 107; 29/54, 50
See application file for complete search history.

(56) References Cited

U.S. PATENT DOCUMENTS

| 3,893,356 | A | | 7/1975 | Atzberger |
| 4,457,065 | A | | 7/1984 | Coate |
| 4,697,318 | A | * | 10/1987 | Wickham et al. ........... 29/33 P |
| 4,831,906 | A | * | 5/1989 | Sugimoto et al. ............. 82/118 |
| 5,119,703 | A | * | 6/1992 | Ruby ........................... 82/138 |
| 5,313,694 | A | * | 5/1994 | Yonemoto et al. .......... 29/27 R |
| 6,279,438 | B1 | * | 8/2001 | Delacou ....................... 82/121 |
| 6,618,917 | B2 | * | 9/2003 | Sugiura et al. ............. 29/27 C |
| 6,640,677 | B2 | * | 11/2003 | Ueda et al. .................... 82/129 |
| 6,715,386 | B2 | * | 4/2004 | Maier .......................... 82/1.11 |
| 6,813,980 | B2 | * | 11/2004 | Inayama ....................... 82/120 |
| 6,928,909 | B1 | * | 8/2005 | Akimoto et al. .............. 82/129 |

FOREIGN PATENT DOCUMENTS

| EP | 1 074 336 A2 | 2/2001 |
| GB | 2 080 174 A | 2/1982 |
| JP | 60-034201 | 2/1985 |

\* cited by examiner

*Primary Examiner*—Willmon Fridie, Jr.
(74) *Attorney, Agent, or Firm*—Breiner & Breiner, LLC

(57) ABSTRACT

The tool support comprises a basic structure (8) on which a slide (5) is movable in a controlled manner transversely to the spindle axis (7), two tool holders (6) being mounted on said slide which are displaceable parallel to each other and serving to hold different tools (9,9'), said holders (6,6') being selectively displaceable in the direction of the spindle axis (7) or away from that axis through an angle of 90° with respect to the direction of movement of the slide (5), and further comprising driving means (1,2,3,3') to displace the slide (5) and the tool holders (6,6') along their axis of movement (Y,Z) into a predetermined working position.

14 Claims, 4 Drawing Sheets

TOOL SUPPORT FOR LATHES

FIELD OF INVENTION

The present invention relates to a tool support for a work piece at the working spindle of a lathe.

BACKGROUND OF THE INVENTION

Tool supports for tools to be mounted on the working spindle of a lathe are known and are useful for machining work pieces of any kind of material. Depending on the work to be performed, appropriate tools have to be chosen and mounted on the tool support. This operation is often very time consuming (secondary processing time). In order to avoid this very complicated process, complex turret heads with different tools are used.

BRIEF SUMMARY OF THE INVENTION

An object of the present invention is to provide a tool support having high precision with a very simple construction and which reduces the secondary processing time (re-tooling) practically to zero.

This object is achieved with a tool support of the type defined herein.

Particularly advantageous embodiments of the invention are defined in the claims.

According to the invention, the tool support enables holding two different tools and selective use of the tools, keeping the cost of the constructive elements of the support and their number at a minimum, particularly when a single motor is used for moving the components of the support, wherein a drive shaft for displacing the slide and selectively the desired tool support. This is provided by the intermediary of a lever having an inner control curve or two cam discs.

The forced sequence of movement is made in a controlled manner, sequentially or simultaneously along the trajectory axis X and Y or by a translatory path. This ensures that the secondary processing time for the selection of a tool is reduced to a minimum.

In order to carry out complicated working steps, it is possible to arrange several tool supports at the spindle (each with two different tools), preferably at angular spaces of 120°, which excludes on the one hand the risk of collision with a neighboring tool and on the other hand reduces the secondary processing time for tool selection to practically zero.

Due to this surprising concept, the productivity of a lathe can be substantially increased, keeping the cost at a low level.

If the tool supports are mounted on a longitudinally movable slide (tool slide), it is possible to expand the use of each double tool in a further working plane (along the Z-axis).

BRIEF DESCRIPTION OF THE DRAWINGS

The invention will be herein after described in more detail on the basis of embodiments and sequences of movement represented in the drawings. In the drawings.

DETAILED DESCRIPTION OF THE INVENTION

Figure 1:
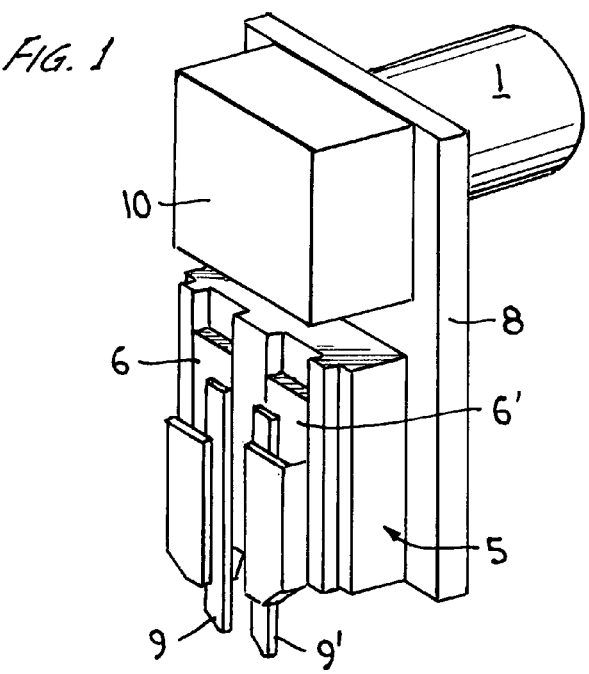
FIG. 1 shows schematically essential components of a tool support in accordance with the invention.

FIG. 1 shows schematically a tool support, in accordance with the invention, having a central drive motor 1 and a base structure 8, on which a laterally displaceable slide 5 with two tool holders 6,6', is arranged. Different tools 9,9' are held in the holders 6,6'. Behind the cover 10, which is connected to the slide 5 and which is displaceable, is arranged drive control elements 2 and 3,3' (see FIG. 2).

The base plate 8 is usually mounted on a Z-slide (not shown), thus allowing an additional controlled movement in the Z-direction (along the spindle).

Due to the additional Z-movements, further simultaneous work operations are possible which permit, particularly for turning automats, a massive increase in productivity.

Figure 2:
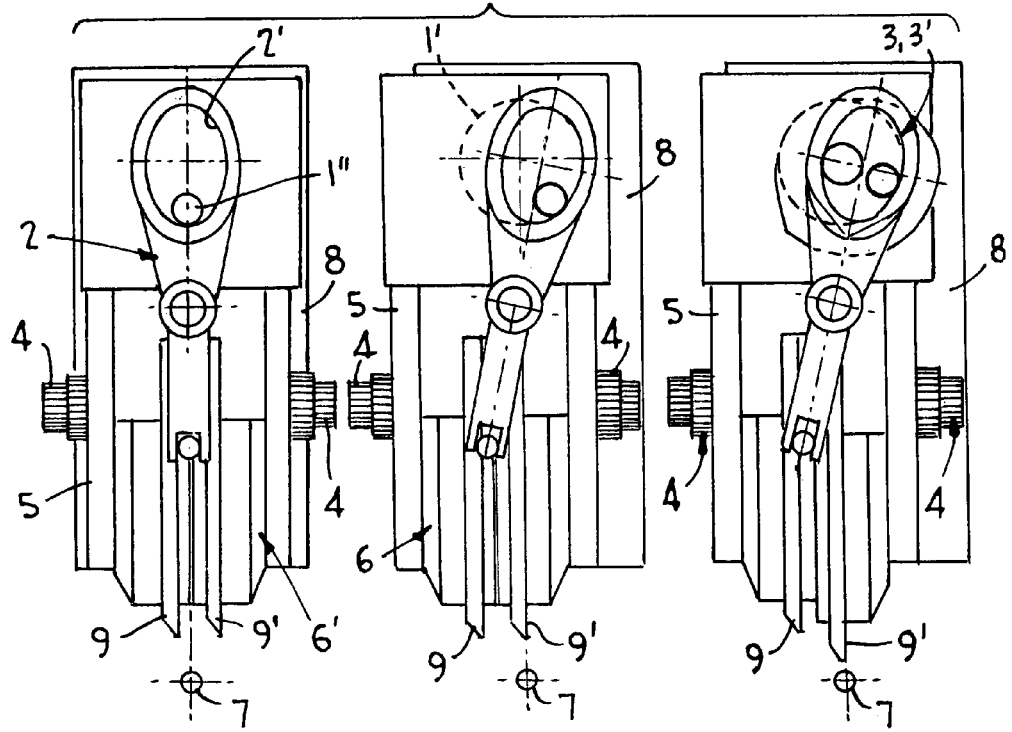
FIG. 2 shows a tool support according to the invention having particularly advantageous driving means in three different positions with regard to the spindle.
Figure 3:
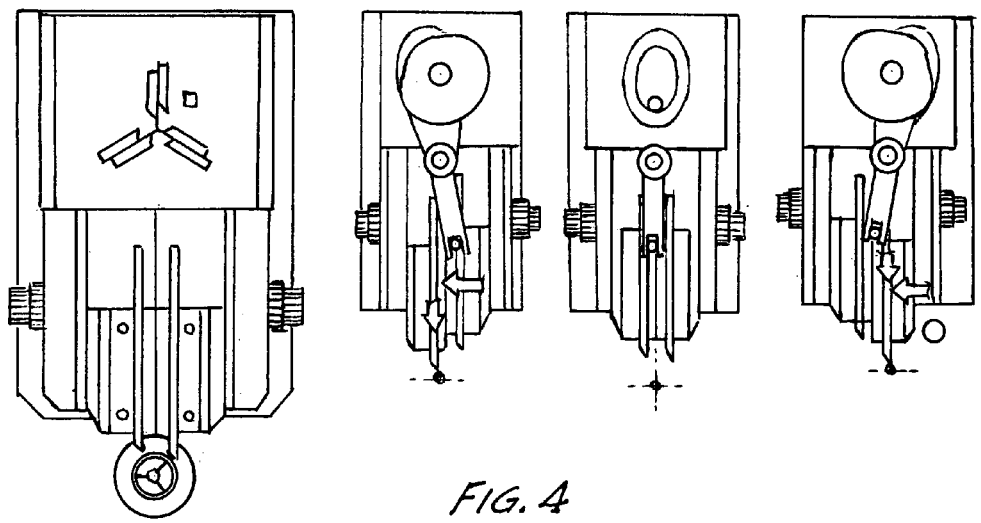
FIGS. 3-8 shows schematically different operational possibilities.
Figure 4:
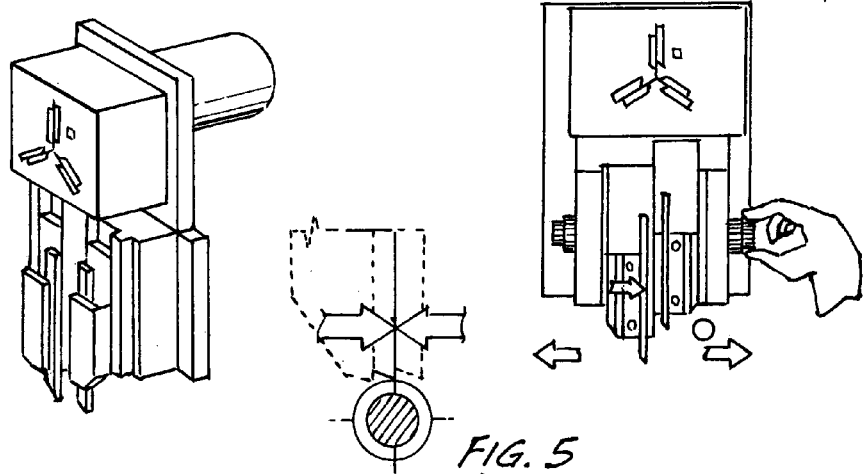
Figure 5:
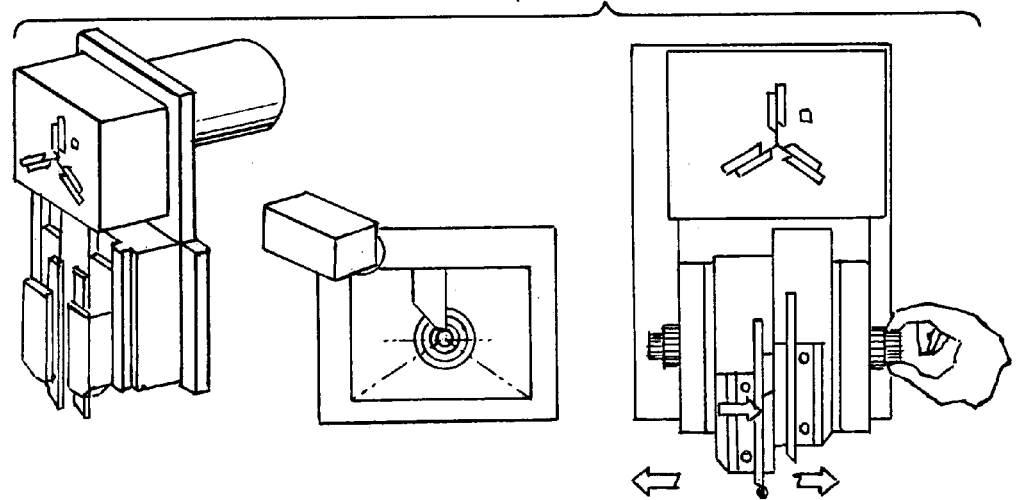
Figure 6:
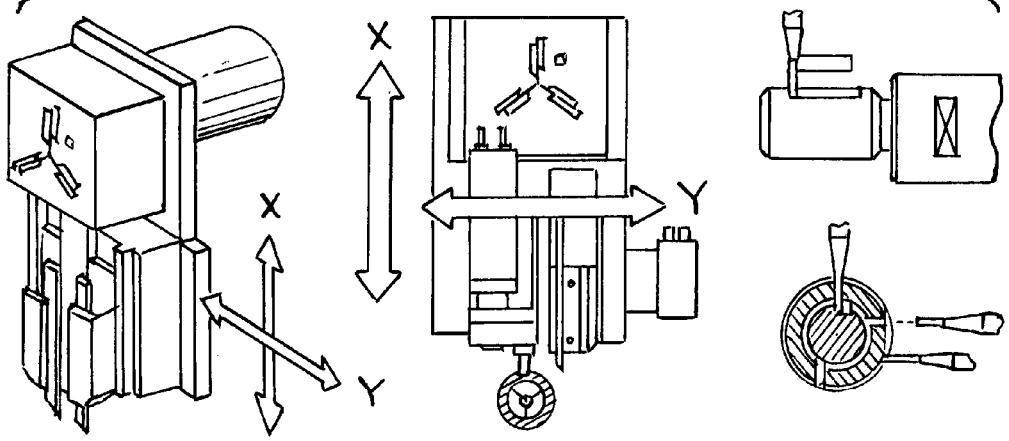
Figure 7:
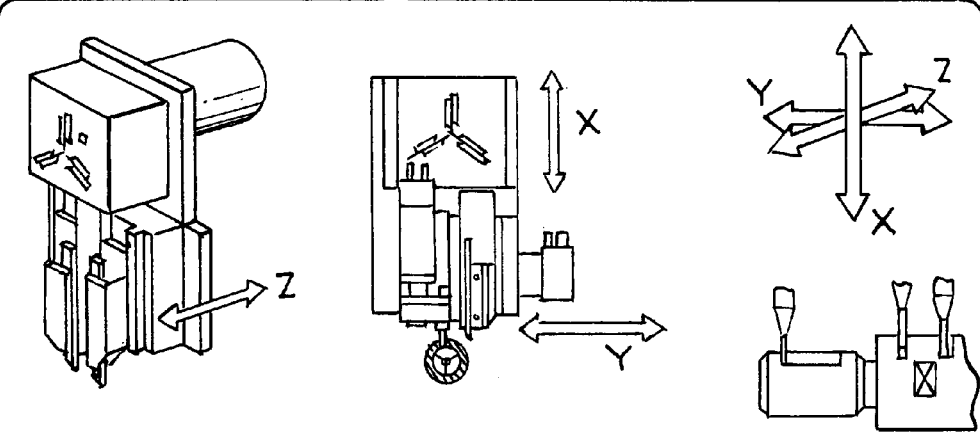
Figure 8:
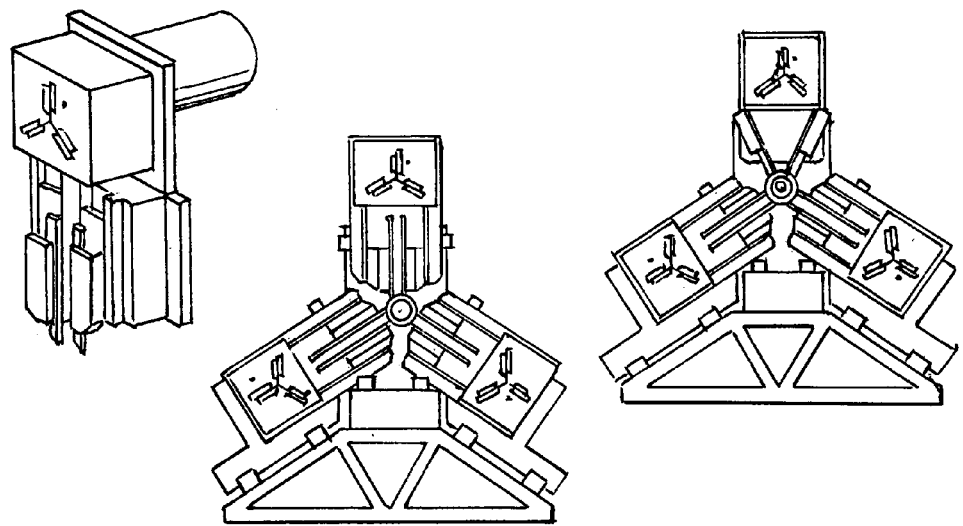

FIG. 2 illustrates schematically the operation principle of the double or twin tool support.

Motor 1 is driven by the intermediary of shaft 1' and the control elements, namely lever 2 and cam 3. The lever 2 with inner curve 2' serves to displace the slide 5 in a transverse direction (Y) until reaching adjustable stops 4 (e.g. locking screws). Such limitation of the displacement path serves to bring the tools 9,9' into a middle position (FIG. 2 outside left). The two cams 3,3' serve to bring the desired tool into a working diameter (in X-direction).

The shifting in the Y-direction can be performed as shown by means of lever 2 up to the desired stop. If the motor shaft continues to rotate the follower element of the inner curve of the lever for further advance against a spring force, while the slide is stopped. Alternatively, a separate drive with a measuring system can be used (attacking, e.g., on the longitudinal side of the slide).

FIG. 2 further shows that after adjusting the middle position of the slide 5 (left side), the stop for the right side tool 9' is approached (middle) and, thereafter, the tool 9' is moved over the one cam 3' into its working position in the direction of the spindle 7.

The feed of the tools 9,9' by means of the corresponding cams 3,3' is carried out by the action of the cams on an extension of the tool holders 6,6'. The latter are moved against a resetting force (a spring, not shown), such that any tool which is not being controlled by the cam remains always out of its working position. The motor shaft 1', departing from the middle position, can be rotated in both directions up to 180°.

As already mentioned, it is possible to arrange a plurality of tool supports around a spindle whereby the described advantages can be used in multiple manners. The increase in performance allows replacement of the curve-controlled turning automats which up to now were considered "irreplaceable".

FIGS. 3-8 show different operational possibilities.

Figure 9:
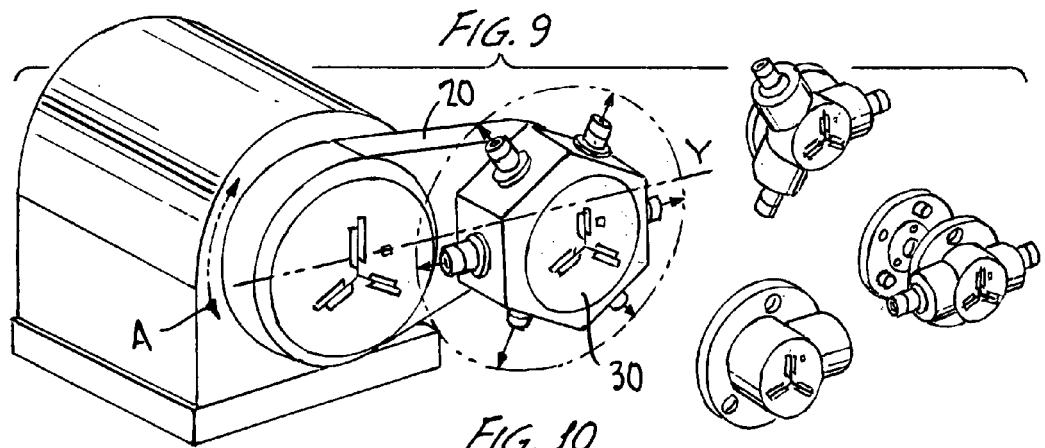
FIG. 9 shows a variant of a tool support according to a further aspect of the invention.

Another object of the invention is a tool support as shown in FIG. 9, which is equipped with a lever 20 which can be rotated around an axis by a motor drive, having at its free end a turret head 30 for tools. Due to the rotatable lever 20 (Y-axis), the head 30 is adjustable in height (A) in a very simple manner, thereby guaranteeing high precision.

The tool support with rotatable arm 20 is displaceable, if mounted on a lathe, preferably in a longitudinal and transverse direction with respect to the spindle (X-axis and Z-axis).

Figure 10:
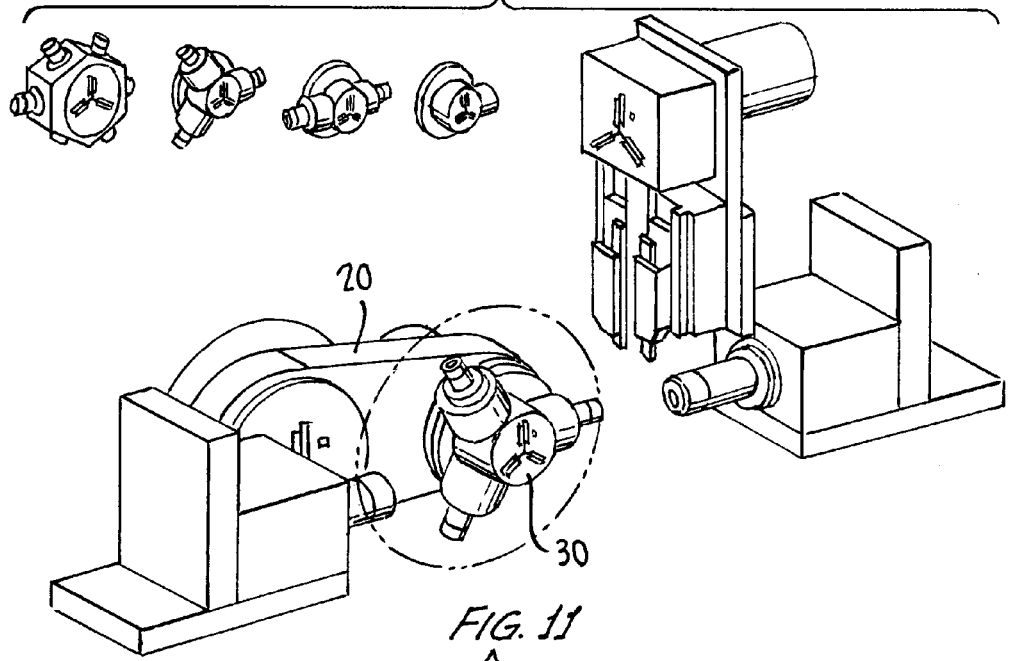
FIGS. 10-11 shows a combination of both tool support systems.
Figure 11:
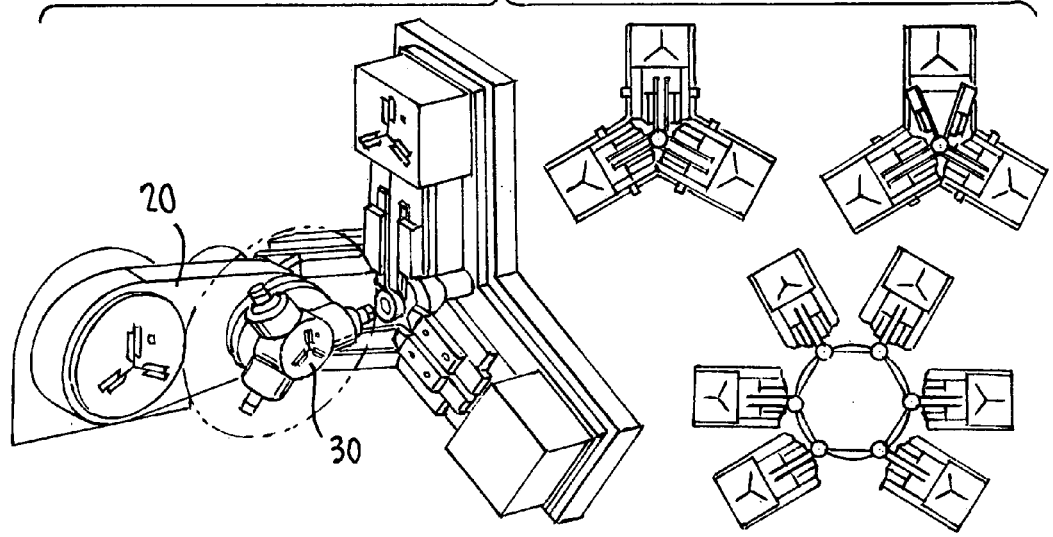

This tool support is particularly suitable for use in combination with the tool support described herein before, leading to a particularly versatile application of different tools, possible applications being schematically shown in FIGS. 10 and 11.

The invention claimed is:

1. A tool support for machining a work piece on a working spindle of a lathe comprising
   a base structure;
   a slide mounted on said base structure which is displaceable in a controlled manner transversely to an axis of the spindle along a Y-axis;
   two tool holders mounted parallel to each other on said slide for holding different tools, wherein said tool holders are displaceable through an angle of 90° with respect to a direction of movement of the slide individually or selectively with respect to the axis of the spindle along an X-axis into a working position or out of the working position, and
   driving means for displacing the slide and the tool holders sequentially or simultaneously along a respective axis of movement for said slide and said tool holders into a predetermined working position.

2. The tool support according to claim 1, wherein said base structure is adjustable along a Z-axis which is parallel to said axis of the spindle.

3. The tool support according to claim 2, wherein said base structure is mounted on a tool slide which is displaceable along said axis of the spindle.

4. The tool support according to claim 1, wherein said driving means comprises a motor having a drive shaft, and a pivotable control lever including an inner control cam surface, wherein pivoting movement of said lever causes displacement of said slide between end stops on said base structure, and two cam disks which selectively displace one of said tool holders into a working position.

5. The tool support according to claim 4, wherein said end stops are individually positionable into a desired position.

6. The tool support according to claim 4, wherein the shaft is pivotable from a neutral position in both pivoting directions up to 180°.

7. The tool support according to claim 1, wherein said driving means is computer-controlled.

8. The tool support according to claim 1, wherein said tool holders are movable into working positions against a resetting force.

9. The tool support according to claim 8, wherein said resetting force is provided by a spring.

10. The tool holder according to claim 4, wherein a follower for the drive shaft of the control lever is displaceable against a resetting force after said slide has reached one of the end stops.

11. The tool support in accordance with claim 7, wherein said driving means is coupled with measuring systems.

12. The tool support in accordance with claim 1, further comprising a motor controlled lever rotatable about an axis having a free end with a turret head for tools thereon.

13. A lathe equipped with a plurality of tool supports, each of said tool supports being a tool support in accordance with claim 1, 2, 3, 4, 5, 6, 7, 8, 9, 10, 11 or 12, wherein said plurality of tool supports are arranged around the working spindle of said lathe and each said tool support includes said driving means for displaceable components of said tool support.

14. The lathe of claim 13, wherein said tool supports are arranged in a star-shaped manner around the working spindle at angular distances of 120°.

* * * * *